United States Patent [19]

Moschitz et al.

[11] 4,437,170
[45] Mar. 13, 1984

[54] METHOD AND CIRCUIT ARRANGEMENT FOR THE ACCEPTANCE AND TEMPORARY STORAGE OF DATA SIGNALS IN A SWITCHING SYSTEM

[75] Inventors: Gerhard Moschitz, Wolfratshausen; Richard Schoonhoven, Munich, both of Fed. Rep. of Germany

[73] Assignee: Siemens Aktiengesellschaft, Berlin & Munich, Fed. Rep. of Germany

[21] Appl. No.: 284,616

[22] Filed: Jul. 20, 1981

[30] Foreign Application Priority Data

Sep. 24, 1980 [DE] Fed. Rep. of Germany ....... 3036034

[51] Int. Cl.³ .............................................. G06F 3/04
[52] U.S. Cl. .................................................... 364/900
[58] Field of Search ... 364/200 MS File, 900 MS File; 179/18 ES; 178/3; 370/58, 61, 16

[56] References Cited

U.S. PATENT DOCUMENTS

| 3,729,715 | 4/1973 | Buedel | 364/200 |
|---|---|---|---|
| 4,076,970 | 2/1978 | Lubarsky, Jr. et al. | 179/175.2 R |
| 4,100,533 | 7/1978 | Napolitano et al. | 340/147 R |
| 4,247,910 | 1/1981 | Cornell et al. | 364/900 |
| 4,331,834 | 5/1982 | Ganz et al. | 178/3 |
| 4,377,859 | 3/1983 | Dunning et al. | 370/58 |

OTHER PUBLICATIONS

Siemens-Zeitscritt 51 (1977), pp. 18-23.
Siemens-Systems EDX, Systems Description (Jul. 1979, Figs. 4 and 10).

*Primary Examiner*—Jerry Smith
*Assistant Examiner*—Mark P. Watson
*Attorney, Agent, or Firm*—Hill, Van Santen, Steadman & Simpson

[57] ABSTRACT

A method and circuit arrangement for the acceptance and temporary storage of data signals in a data switching system includes a data communication control to which the data signals are supplied, a connection memory which makes information available to the data communication control, and a memory arrangement for serving as the data storage. The connection memory stores the address of a memory area within the memory arrangement which is available for the acceptance and temporary storage of data signals in the connection memory for each line section. In response to the first activation of such a memory area, the addresses of additional memory areas are made available to the data communication control.

10 Claims, 2 Drawing Figures

METHOD AND CIRCUIT ARRANGEMENT FOR THE ACCEPTANCE AND TEMPORARY STORAGE OF DATA SIGNALS IN A SWITCHING SYSTEM

BACKGROUND OF THE INVENTION

1. Field of the Invention

The invention relates to a method and to a circuit arrangement for the acceptance and temporary storage of data signals supplied via line sections in a data switching system, before processing or relaying of such data signals to other line sections. Such line sections are lines leading to or from data subscriber locations, as well as lines leading to or from further data switching systems.

2. The Prior Art

A method and a circuit arrangement of the type described above are already known ("Siemens Zeitschrift", 51, 1977, No. 1, PP. 18 through 23; Company Publication "Siemens-System EDX Systembeschreibung", Edition of 7/79, particularly FIGS. 4 and 10). In this known circuit arrangement, a buffer memory is provided in the data transmission control device, in which memory data which have been supplied from one of the line sections, are temporarily stored before being transmitted onto a different line section. Such a memory is rigidly allocated to each line section. The storage of data signals in the individual buffer memories takes place cyclically, whereby the central processing unit must restore the data signals before their further processing. Thus, the memories have to be greater in proportion to higher transmission rates on the individual line sections. The restorage requires a correspondingly high work load in the central processing unit of the data switching system.

SUMMARY OF THE INVENTION

The principal object of the invention is to provide a way in which one can make do with a lower load on the central processing unit in the course of data signal processing, while still observing the critical real time conditions for the allocation of buffer memory areas.

This object is inventively achieved by depositing, in the connection memory for each line section via which data signals are supplied, an address of a memory area of the memory arrangement in readiness for the acceptance and temporary storage of the appertaining data signals. Also, in response to the first activation of such a memory area, the address of a further memory area is offered to the data transmission control device as that memory area which is allocated to a further line section in response to a request for a data signal storage.

The present invention offers the advantage that the central processing unit is no longer loaded to such a great degree as in the known methods. The achieved relief of the central processing unit results because the data signals to be temporarily stored are not first deposited in a buffer memory, but are immediately introduced into the memory area of the memory arrangement serving as the primary memory. Since the appertaining memory area is then no longer overwritten, a restorage of the data signals is not required. The addresses of the memory areas (which can be of differing size) are stored in the existing connection memory. By means of the feature of offering the address of a further memory area of the memory arrangement in response to the first activation of a memory area made available for a data signal storage, there also follows the advantage that no special operations with respect to the determination of memory areas must be carried out for a data signal acceptance. The memory areas available for a data signal storage in the memory arrangement can be fixed in a simple manner by means of a cantenation, which is referred to in the course of storing data signals which are supplied from the line sections, or are supplied in the course of allocation of memory areas to the individual line sections. In this way, various memory areas of the memory arrangement for a data signal storage are preferably allocated to the various line sections.

Expediently, the address of the said further memory area of the memory arrangement is fetched from that memory area which has just been allocated to a line section, i.e., is activated for the first time. The associated address is then deposited in a buffer register of the data transmission control device and is only written from said buffer register into the connection memory at a memory location corresponding to a new, further line section to be covered, upon occurrence of a signal requesting data signal transmission. This offers the advantage of a particularly simple and fast offering of the addresses which indicate the memory areas serving for a data signal storage.

Preferably, the writing of the address into the connection memory is carried out so that the address fetched from the memory arrangement in response to the occurrence of a request signal overwrites and displaces the address will contained in the buffer register from said buffer register for emission to the connection memory. By so doing, there results a particularly fast and simple operation with respect to offering the address.

The address deposited in a memory location of the connection memory is preferably changed with each further occurrence of a request signal over the line section belonging to the associated memory location. In this way, there results the advantage that the memory locations are indicated in a particularly simple manner and the respective size of the memory area can also be taken into consideration.

Under certain conditions, it can also be expedient to alter and address transmitted from the buffer register to the connection memory on the occasion of such transmission. Use is made of such a measure in an advantageous manner when the address residing in the buffer register indicates a memory location (head cell) in the memory arrangement at which the address of a further memory area is deposited. By changing the address transferred from the buffer register to the connection memory, the location in the memory area allocated to a line section for the data signal storage which directly follows the memory location just mentioned can, for example, be indicated.

For the implementation of the inventive method, it is expedient to employ a circuit arrangement wherein the data transmission control device connected to the individual line sections, and to the memory arrangement, contains a buffer register connected to a connection memory, such buffer register being connectible at its input to the memory arrangement for the acceptance of addresses which indicate memory areas which can be made available for a data signal storage in response to a request; and buffer register can likewise be connected at its output to the memory arrangement to allow that memory area to be addressed which is referenced by the address contained in it, and from which an address indicating a further memory area can be fetched; and the connection memory is connected to its address writing input via an address change device at its output which emits the addresses identifying the respective memory aeas of the memory arrangement to be employed. This results in the advantage of a particularly simple arrangement for the data transmission control device.

Expediently, individual memory locations belonging to the individual line sections are in individual memory locations of the connection memory, such locations storing the address indicating a memory area and also an identifier bit by which a distinction can be undertaken between line sections to which a memory area in the memory arrangement has already been allocated and line sections to which a corresponding memory area in the memory arrangement is to be allocated in response to a request. This results in a particularly simple arrangement for the control.

Preferably, upon transmission of an address from the buffer register to the connection memory, the identifier bit which is contained in the memory location of the connection memory, (provided for the acceptance of the appertaining address) can be changed at the same time. Thus, the data transmission control device can cooperate with the connection memory in a particularly simple manner. The identifier bit, moreover, can also be changed on the basis of other control signals, for example, proceeding from the central processing unit.

Expediently, the data transmission control device is connected to the memory arrangement via an access control device which makes direct memory access possible. This offers the advantage of a particularly simple operation between the data transmission control device and the memory arrangement.

Expediently, the individual memory locations of the connection memory are addressable together with a sampling of the individual line sections, for the purpose of determining the occurrence of connection request signals or data signals, respectively. This results in a simple arrangement for the line sections and the connection memory.

BRIEF DESCRIPTION OF THE DRAWINGS

In the following, the invention is described in greater detail by way of example on the basis of drawings.

DESCRIPTION OF THE PREFERRED EMBODIMENT

Figure 1:
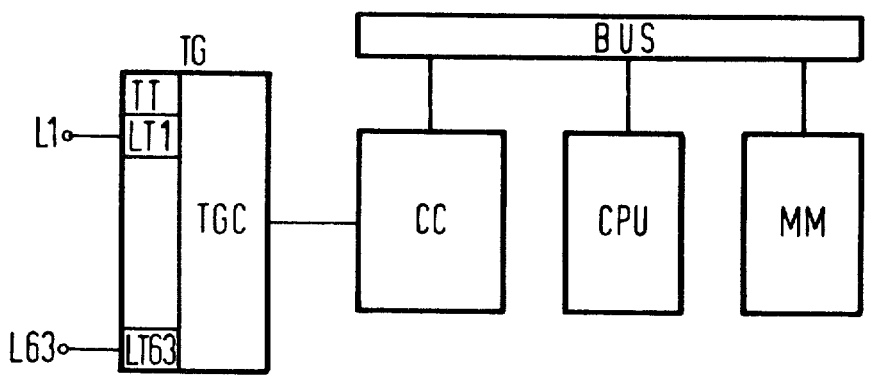
FIG. 1 shows a block diagram of a data switching system in which an illustative embodiment of the invention is employed.

FIG. 1 shows a block diagram of a data switching system incorporating an illustrative embodiment of the invention. Only one line adapter set TG is provided, having a check line connection TT and 63 line connections LT1 through LT63. Line sections L1 through L63 are connected to these line terminals. A line group control TGC belongs to the line terminals belonging to the line adapter set and to the appertaining check line terminal.

A data communication control CC is connected to the line adapter set TG. This data communication control CC is connected to a bus line BUS. Further, a central processing unit CPU and a main memory MM are connected to the bus line BUS.

As is known from the reference cited aove, the data signal transmission between various line sections in the data switching system illustrated in FIG. 1 takes place, given cooperation of the data communication control CC. The data communication control interrogates the line sections and/or line terminals as to the existence of connection requests or data signals, in order to then relay these to the desired line section after temporary storage. The information as to where the data signals are to be relayed is deposited in a connection memory of the appertaining data communication control CC. Such information is determined at the beginning of each data connection, and is deposited at that time.

The central processing unit CPU serves for the control of the operation of the data communication control CC and of the main memory MM. The operations connected therewith, however, need not be discussed in greater detail here since these operations are well known.

Figure 2:
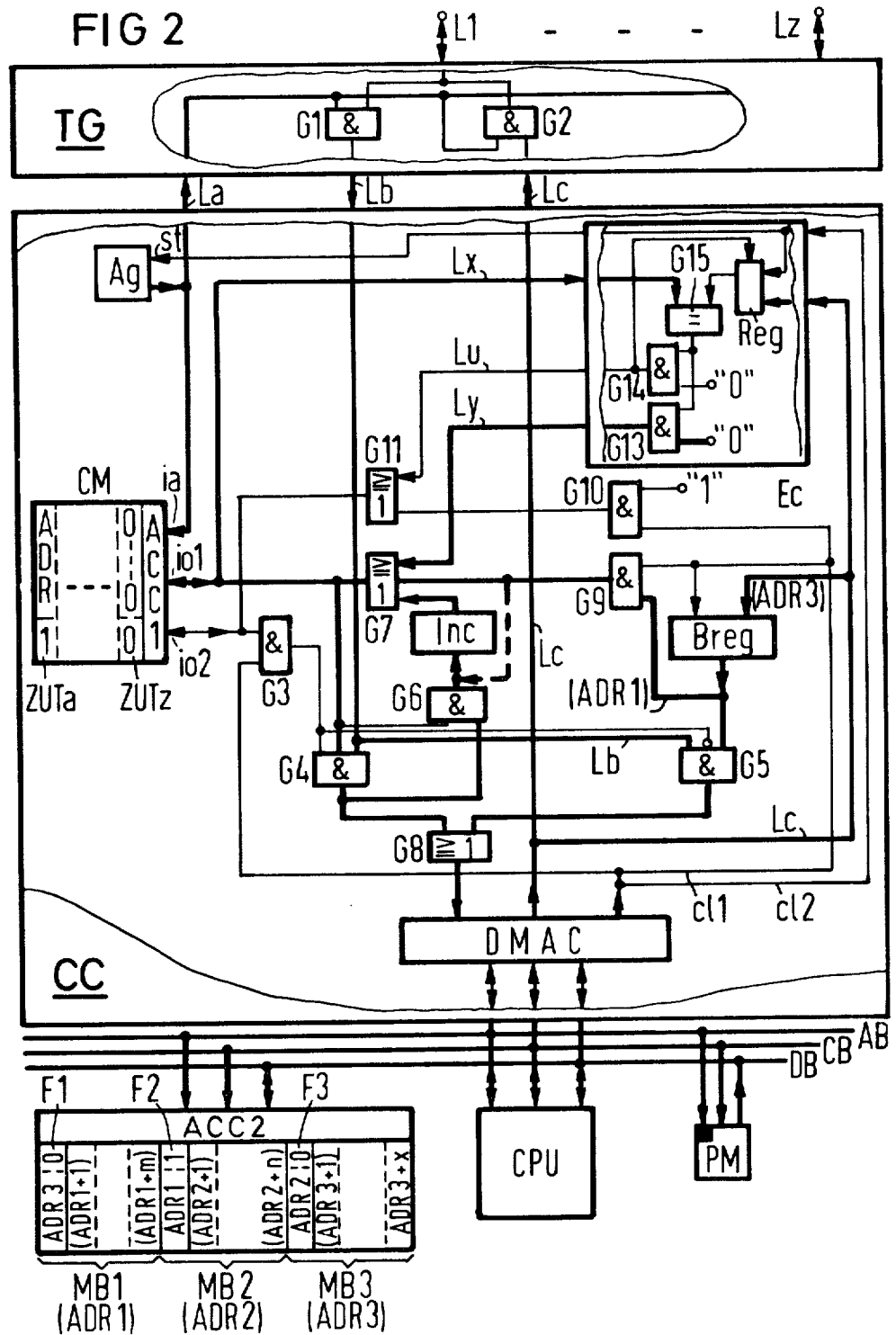
FIG. 2 shows a block diagram of a circuit arrangement according to the invention as it can be employed in the data switching system of FIG. 1.

The block diagram of a possible format of a circuit arrangement which is contained in the data communication controls indicated in FIG. 1 is shown in FIG. 2. In FIG. 2, this control device is referenced in general with CC. The control device CC is connected via connection lines La, Lb, Lc to a line adapter set TG to which, according to FIG. 2, line sections L1 through Lz are connected which can transmit signals both in an incoming and an outgoing direction. According to FIG. 2, each such line section is connected to two AND elements G1, G2 in the line adapter set TG. These logic elements G1, G2 are connected with one input to an address line which is connected to the line La. The output of the AND element G1 is connected to the line Lb and the other input of the AND element G2 is connected to the line Lc.

The lines La, Lb, Lc (like all other lines illustrated in FIG. 2 by thick, continuous lines) can respectively comprise a multitude of individual lines, for example, eight individual lines respectively. The aforementioned AND elements will then be provided in a corresponding plurality in order to be able to transmit, in parallel, the bits forming the various data signals.

The data communication control CC according to FIG. 2, further, is connected to a bus line system having an address bus line AB, a control bus line CB and a data bus line DB. Each of these three bus lines comprises a plurality of individual lines, for example, eight individual lines respectively. According to FIG. 2, a central processing unit CPU and two memories DM, and PM which, for example, may form the main memory MM indicated in FIG. 1 are connected to the appertaining bus lines. The memory PM according to FIG. 2 represents a program memory; for example, it can be a ROM memory. The memory DM according to FIG. 2 represents the actual data memory which is also referred to as the memory arrangement in the following. The memory DM can be a RAM memory. It is connected to the three said bus lines AB, CB, DB with a memory access control device ACC2.

The data communication control CC exhibits a connection memory CM which exhibits memory locations belonging to the individual line sections L1 through Lz. These memory locations are likewise addressed with the addresses of the individual line sections L1 through Lz. An address generator Ag serves that purpose, said address generator Ag being connected with its address output (which may carry, for example, twelve individual lines) to an address line connected to the address line La and to the address input ia of the memory access control device ACC1 of the connection memory CM.

The memory access control device ACC1 of the connection memory CM is connected with an input-/output io1 both to an input of an AND element G4 as well as to the output of an OR element G7. The AND element G4 is connected with a further input to the output of an inhibit element G3. This inhibit element is connected with one signal input to a further input/output io2 of the memory access control device ACC1 of the connection memory CM. With one inhibiting input, the inhibiting element G3 is connected to a control line c11 which is connected to an output of a memory access control device DMAC provided for a direct memory access. Moreover, one OR element G11 is connected with its output to the aforementioned input/output io2 of the connection memory CM.

The AND element G4 is connected with a further input to the line Lb, and a further AND element G5 is connected with its input to said line. Said AND element G5 is connected with a blocking input to the output of the inhibiting element G3. With yet a further input, the AND element G5 is connected to the output of a buffer register Breg.

The AND element G5 is connected with its output to an input of an OR element G8 which is connected with a further input to the output of the AND element G4. The output of the OR element G8 is connected to an input of the access control device DMAC. The output of the AND element G4, further, is connected to an input of an AND element G6 which has another input connected to the input/output io1 of the connection memory CM.

The input of an incremental circuit Inc is connected to the output of the AND element G6. The incremental circuit Inc serves to increase the value, for example, by +1, of a signal supplied to it—which is an address, as described below. At its output side, the incremental circuit Inc is connected to one input of the OR element G7. The output of an AND element G9 is connected to a further input of the OR element G7. The AND element G9 is connected with one input to the output of the buffer register Breg and is connected with a further input, together with an input of the register Breg, to the control line c11. As indicated by means of a broken line in FIG. 2, the incremental circuit Inc can, if need be, also be connected at its input side to the output of the AND element G9.

The OR element G7 is connected with a further input via a line Ly to an output of a setting circuit Ec. The setting circuit can, for example, consist of AND elements G13, G14, of a comparator G15, and of a register Reg. The AND elements respectively carry "0" signals at their one inputs. With their other inputs, the AND elements are connected to the output of the comparator G15. The comparator G15 is connected with its one input side via line Lx to the input/output io1 of the connection memory CM and is connected with its other input side to the output of the register Reg, which register is connected at its input side, via a line Lc, to the data signal output, and a further input is connected via a control line C12 to a control output of the memory access control device DMAC. With a reset input, the register is connected to the output of the AND element G14. The control line c12 is connected to a stop input "st" of the address generator Ag. The address generator Ag will cease emitting addresses upon supply of a "1" signal to its stop input "st". In this case, an address supplied to the comparator G15 proceeding from the register Reg can be compared to an address supplied from the connection memory CM via the line Lx, as described below. It should be noted that in case a coincidence is determined between addresses compared to one another, "0" signals are conducted via the lines Lu and Ly to the logic elements G11 and G7, and to the inputs/outputs io2 and io1 of the connection memory CM, which signals are then written into that memory location which is still addressed by the address generator Ag.

An AND element G10 is connected at its output to an input of the OR element G11. One input of the AND element G10 is connected to a "1" signal. With its other input, the AND element G10 is connected to the aforementioned control line c11.

The buffer register Breg is connected with a further input to the line Lc. Via said line Lc, addresses are supplied to the buffer register Breg for temporary storage. These addresses are called in from the memory arrangement DM, as described below. Before considering the operations connected therewith, let us first consider the organization of the memory arrangement DM. The memory arrangement DM is divided into a plurality of memory areas which are referenced in FIG. 2 with MB1, MB2 and MB3. These memory areas can exhibit differing sizes, and have different addresses. The address ADR1 belongs to the memory area MB1; the address ADR2 belongs to the memory area MB2; the address ADR3 belongs to the memory area MB3. The memory areas are always addressed by one of these addresses, with the first memory location of the respective memory area being addressed first. In the memory area MB1, the address ADR3 resides. In the memory area MB3 (the memory area which is indicated by the address ADR3) the address ADR2 resides. The address ADR1 resides in the corresponding memory location in the memory area MB2 designated by this address ADR2. The address ADR1 again indicates the first memory area MB1.

Expediently, no address is entered in the appertaining memory location when a transfer is not to be undertaken without further ado from the last memory area of the memory arrangement DM to the said first memory area. Moreover, the organization of the memory arrangement DM can be undertaken in such manner than one of the respective remaining memory locations of the respective memory area is addressed with an enlarged address. Thus, the remaining memory locations ADR1+1 through ADR+m of the memory area MB1, for example, are designated by the addresses enlarged by +1 through +m. In an analogous manner, the remaining memory locations ADR2+1 through ADR2+n of the memory area MB2 are designated by the addresses enlarged by +1 through +n. Finally, the remaining memory locations ADR3+1 through ADR3+x of the memory area MB3 are designated by the addresses enlarged by +1 through +x.

The individual memory areas of the memory arrangement further store identifier bits F1, F2 and F3, which each indicate the availability of the address deposited in the associated memory area. In the present example (shown in FIG. 2), the identifier bit places F1 and F3 are cancelled and the bit place F2 is set. This is discussed in greater detail below.

The operating mode of the circuit arrangement illustrated in FIG. 2 will now be described in greater detail. Let it first be assumed that the connection memory CM contains no memory area addresses in its memory locations and contains only "0" bits in its identifier fields which, according to FIG. 2, are indicated with ZUTa or ZUTz. The absence of an address is indicated in FIG. 2 with 0 . . . 0 in the connection memory CM. However, it should be noted that absolutely no address information need be contained in the connection memory CM in case tristate components are employed for the apparatus of FIG. 2. Moreover, it is presumed that an address, for example, the address ADR1, of a memory area of the memory arrangement DM is kept in readiness in the buffer register Breg, as that memory area which can be now made available in the memory arrangement DM for the acceptance and temporary storage of data signals.

Given the conditions indicated above, let it now be assumed that a request signal for data signal storage is supplied via the line Lb on the basis of which a memory area in the memory arrangement DM is to be allocated to that line section from which this request signal has been supplied. The address indicating this line section, which is emitted by the address generator Ag, also indicates the memory location in the connection memory CM which belongs to the associated line section. Since no memory area in the memory arrangement DM has yet been allocated to said line section, the identifier bit ZUT of the appertaining memory location is a "0" bit. This results in a "0" signal being emitted from the output of the inhibiting element G3, with only the AND element G5 being capable of being driven into its conductive state in response to its occurrence. The request signal is supplied to said AND element G5 at its input connected to the line Lb, and the address of the memory area of the memory arrangement DM is supplied to the input of G5 which is connected to the output of the buffer register Breg, which stores the address in preparation for an allocation. The address (which can be the address ADR1) is emitted from the output of the AND element G5 via the OR element G8 to the access control device DMAC. This access control device DMAC now effects a direct memory access to the memory arrangement DM. This means that the access control device DMAC disables the central processing unit CPU and now enters into a connection with the memory arrangement DM. The result of this is that the memory area MB1 of the memory arrangement DM is addressed. In particular, the first memory location is addressed in this memory area MB1 (the address ADR3) and, if need be, the cancelled end identifier bit being contained in such first memory location. This address (ADR3) is fetched from the access control device DMAC non-destructively. The address ADR3 remains in the appertaining memory location of the memory area MB1 and, moreover, it is emitted from the access control device DMAC via the line Lc. The address ADR3 arrives via said line Lc to the address input of the buffer register Breg, and that address is written into Breg when a "1" control signal occurs on the control line c11 which corresponds to the appertaining identifier bit. With the occurrence of said "1" control signal the address ADR1, emitted from the output of the buffer register Breg, which, for example, may be a shift register, is conducted via the now-conductive AND element G9 and the OR element G7 to the input/output io1 of the connection memory CM. Via said input/output io1, the appertaining address is now written into the memory location of the connection memory CM which is still addressed by the address generator Ag, as appertaining to the line section via which the request signal had previously been accepted.

The sequence with which the address generator Ag emits its addresses will be chronologically matched to the operations considered above. Moreover, the address ADR1 emitted via the AND element G9 is conducted, if need be, via the incremental circuit Inc in order, for example, to be increased in value by +1. As already indicated above, one makes use of such a feature when the address emitted from the output of the AND element G9 only indicates the first memory location of a memory area of the memory arrangement DM.

With the occurrence of a "1" control signal on the control line c11, moreover, the AND element G10 is conductive so that a "1" signal occurs at its output. This "1" signal arrives via the OR element G11 at the input/output io2 of the connection memory CM. Via this input/output io2, the appertaining "1" signal is written into the identifier bit place, for example, ZUTz of that memory location which belongs to the line section which previously emitted a request signal. The associated identifier bit place is only one bit place of the memory location in which the address ADR1 has also been written. Following this operation, the connection memory CM then contains an address at the appertaining memory location as shown in FIG. 2, for example, with ADR in the left part of the connection memory CM, and an identifier bit "1" as shown in the identifer bit place ZUTa. The associated address can, for example, be the address ADR1 or ADR1+1. The address ADR3 now resides in the buffer register Breg.

Before a further line section is addressed by the address generator Ag, another signal can be emitted by the access control device DMAC via the line Lc, which signal indicates readiness for acceptance and intermediate storage of data signals. Such a signal can then be evaluated by that device which has emitted the signal as a transmit request signal, whereupon data signals are then emitted by the appertaining device.

When data signals are supplied via that line section which has an appertaining memory location of the connection memory CM where an address and a "1" identifier bit had previously been written, then the occurrence of such data signals means that these are relayed via the line Lb, given corresponding drive of the line group TG proceeding from the address generator Ag. The appertaining memory location of the connection memory CM is then addressed by means of the address emitted by the address generator Ag at the appertaining point in time. Accordingly, a "1" bit now appears at the input/output io2 of said connection memory, and because of the absence of a "1" control signal at the inhibiting input of the inhibiting element G3, a "1" signal is produced at the output of the inhibiting element. The AND element G4 is now prepared for a transmission. The address bits of the address which is called in from the now addressed memory location of the connection memory CM are supplied to said AND element G4 at the input connected to the input/output io1 of the connection memory CM. An addressing of the memory arrangement DM then takes place with this address, via the access control device DMAC. The data signal bits subsequently received via the line Lb are then written into the memory location or memory area of the memory arrangement DM addressed in that manner. The address emitted from the output of the AND element G4 arrives via the AND element G6 at the incremental circuit Inc, which in turn emits an address to the connection memory CM, via the OR element G7, said address having been increased by one. The address is then rewritten in that memory locatin of said connection memory CM which is still addressed by the address generator Ag.

Data signals are now deposited in the memory locations of the memory area MB1 in the manner described above, whereby the address of the memory location of the memory area MB1, which is to be addressed as the next memory location for the acceptance of data signals, is rewritten into the connection memory CM. In this way, these operations cycle with respect to one and the same line section.

When, on the other hand, data signals are to be accepted via a line section which differs from that which has just been under consideration, the request signal is first supplied via the line section, and a sequence of operations occurs, corresponding to the operations described above, in response to its occurrence. Thus, with the occurrence of such a further request signal, the AND element G5 is first driven into its transmissive state, because the connection memory CM has only stored a "0" or, has cancelled an entry at the identifier bit place (ZUTa through ZUTz) of the memory location belonging to the appertaining line section. The memory area MB3 of the memory arrangement DM is addressed with the address contained in the buffer register Breg (the address ADR3 in the example). As a result, the address ADR2 is non-destructively fetched from the first memory location of this memory area MB3, and is supplied to the buffer register Breg. Upon the writing of this address ADR2 as the address which indicates a further memory area of the memory arrangement DM for a data signal storage, the address ADR3 still contained in the buffer register Breg is written into the connection memory CM via the AND element G9 and the OR element G7. The address which indicates the line section via which the request signal has just been accepted still pends at the address input ia of the connection memory CM. Thus, the address location belonging to the line section into which the address ADR3 is now written is addressed in the connection memory CM. Moreover, the identifier bit of this memory location is set to "1".

Operations which fully correspond to the operations considered above occur when a request signal is supplied via yet another line section. In this case, the memory area MB2 is addressed, and the address ADR1 is fetched therefrom as the address of the memory area which would subsequently be available for a further allocation. In the meantime, data signals contained in the memory area MB1, which is indicated by the address ADR1, could be overwritten by means of new data signals. In order to avoid difficulties connected therewith, the identifier bit fields of the memory areas of the memory arrangement DM, catenated in succession, are set to "0" to indicate that the appertaining memory areas are available in the course of the successive memory area allocation. It is only the last memory area of the memory areas catenated in succession in such manner which contains a "1" bit as an identifier bit which indicates that the end of the memory area chain has been reached. According to FIG. 2, the identifier bit locations F1 and F3 respectively exhibit a "0", whereas the identifier bit location F2 exhibits "1". If one now assumes that the last memory area of the successively catenated memory areas of the memory arrangement DM are made available for a data signal acceptance and data signal intermediate storage, then further requests for allocation of corresponding memory areas cannot be considered until the address ADR1 is again written into the buffer register Breg. This is undertaken by means of the central processing unit CPU according to FIG. 2 when said unit has information concerning the fact that the data signals have been read out at least from the memory area MB1.

The central processing unit CPU according to FIG. 2 controls the cancellation of the statements stored in the connection memory CM when the data signal processing has been terminated with respect to one of the line sections to which a memory area in the memory arrangement DM had been allocated. In this case, the central processing unit CPU emits the address of the associated memory area, together with a control signal, to the data communication control CC. The address is available to the central processing unit CPU on the basis of the fact that the associated memory area had previously been serviced given the cooperation of the central processing unit CPU in order to relay the data signals contained in it.

The signals thus emitted by the central processing unit CPU cause the occurrence of a "1" control signal via the access control device DMAC on the control line c11 and also produce the address on the line Lc. The control signal effects the writing of the address in the register Reg of the setting circuit Ec. Moreover, the control signal causes the address generator Ag briefly to cease emitting addresses. In this way, it is assured that the address causes no disruptions whatsoever via the line Lc.

By means of the comparator device G15, the address contained in the register Reg is subsequently compared to the addresses successively emitted by the connection memory CM via the line Lx. These addresses are offered due to successive addressing of the connection memory CM by the address generator Ag. If the comparator device G15 determines coincidence of the addresses which it has compared, then it emits a "1" signal at its output. This signal renders the AND elements G13 and G14 transmissive, and "0" signals are conducted via the lines Ly and Lu to the inputs/outputs io1, 102 of the connection memory CM in which the appertaining "0" signals are inscribed in that memory location which is indicated by the address still emitted by the address generator Ag. Thus, the address of that memory location which is allocated to that line section to which the memory area had been allocated, is now stored in the register Reg. The emission of a "0" output signal from the AND element G14 also causes the content of the register Reg to be subsequently cancelled. Thus, a memory area of the memory arrangement DM can again be subsequently allocated to the appertaining line section in response to a corresponding request.

Although only individual logic elements are shown in the data communication control CC according to FIG. 2, it is apparent that addresses with a plurality of bits occur at the inputs and at the outputs of thse logic elements. The logic elements shown in FIG. 2 each represent a corresponding plurality of logic elements which make possible a parallel transmission of the bits respectively supplied to them. It should be noted that in an alternative arrangement, a microprocessor system, to which the memory access control device DMAC as well as the line adapter set TG are connected, could be employed for the circuit arrangement of the data communication control CC shown in FIG. 2.

In view of the setting or cancelling operation described above in the connection memory CM, and in the memory arrangement DM, it should also be observed that the necessary setting or cancel signals can be generated in another manner. Thus, the identifier bit in the connection memory CM, which indicates the availability for allocation of a memory area of the memory arrangement DM, can be reset by using control signals (for example, block end signals) transmitted via the still appertaining line section, or generated by the central processing unit CPU, or generated from internal signals of the control device CC upon attainment of the end of a data area. Subsequent requests for storage data signals which are supplied via the line sections then effect an allocation of such memory areas of the memory arrangement DM which can again be allocated.

Although only a single memory arrangement has been described above, however, a plurality of memory arrangements with memory areas which differ with respect to one another in size can also be employed with the present invention without further ado. In this case, a separate buffer register (Breg) would be provided for each memory arrangement. The selection of the respective buffer register could preferably take place by means of additional control identifier bits which could be deposited in the connection memory CM.

What is claimed is:

1. A method for the acceptance and temporary storage of data signals supplied via line sections in a data switching system before processing or relaying of said data signals to other line sections, employing a data communication control to which the line sections are connected, said data communication control having a connection memory for storing starting addresses of memory areas, and a memory arrangement which allows memory areas to be made available to the line sections for data signal storage, comprising the steps of
 supplying an address to the connection memory, which address is the starting address of the memory area which is available for the acceptance and temporary storage of data signals supplied by a line section requesting data signal storage; and
 in response to the activation of a first memory area, supplying to the data communication control the starting address of the next available memory area allocated for the acceptance and storage of data signals supplied by the next requesting line section.

2. The method according to claim 1, including the steps of
 fetching the address of the said next available memory area of the memory arrangement from that memory area which is being activated for the first time;
 depositing said address in a buffer register of the data communication control, and
 writing said address from said buffer register into said connection memory upon occurrence of a request signal on a further line section, said writing being into the connection memory at a memory location associated with said line section.

3. The method according to claim 2, wherein the address fetched from the memory arrangement in response to the occurrence of a request signal displaces the address contained in the buffer register from said buffer register for emission to the connection memory.

4. The method according to claim 3, including the step of changing the address deposited in a memory location of the connection memory with each further occurrence of a request signal via the line section associated with said memory location.

5. The method according to claim 3, including the step of changing the address transferred from the buffer register to the connection memory during said transfer.

6. Apparatus for the acceptance and temporary storage of data signals supplied via line sections in a data switching system before processing or relaying of said data signals to other line sections, comprising:
 a. a data communication control connected to the line sections, having a connection memory for storing starting addresses of memory areas;
 b. a memory arrangement connected to said data communication control for allowing memory areas to be made available to the line sections for data signal storage;
 c. means for depositing an address of a memory area of the memory arrangement into the connection memory for each line section via which data signals are supplied, said addresses indicating the memory area available for the acceptance and temporary storage of data signals;
 d. means responsive to the first activation of an area in said memory arrangement for supplying the address of a further memory area to said data communication control, for allocation of said further memory area to a further line section for data signal storage in response to a request for such storage;
 e. said data communications control having a buffer register connected to said connection memory;
 f. means connecting the input of said buffer register to said memory arrangement for the transmission of addresses which indicate memory areas which are available for data signal storage in response to a request therefore;
 g. means selectively connecting the output of said buffer register to said memory arrangement for addressing said memory arrangement, whereby an address for a further memory area can be fetched; and
 h. means including an address change device connected with the output of said connection memory and with its input, for changing addresses stored therein corresponding to memory areas to be employed in said memory arrangement.

7. The circuit arrangement according to claim 6, wherein individual memory locations in the connection memory associated with the individual line sections store the address indicating a memory area in the memory arrangement, and store an additional identifier bit for identifying line sections to which a memory area in the memory arrangement has already been allocated and line sections to which a corresponding memory area in the memory arrangement is yet to be allocated in response to a request.

8. The arrangement according to claim 7, including means for altering the identifier bit which is contained in the memory location of the connection memory provided for the acceptance of the memory area address, said alteration occurring at the same time as the transfer of an address from said buffer register to said connection memory.

9. The circuit arrangement according to claim 6, including means for connecting said data communication control to said memory arrangement via a direct memory access control device.

10. The circuit arrangement according to claim 6, wherein the individual memory locations of the connection memory are addressable together with an interrogation of the individual line sections for the purpose of determining the occurrence of connection request signals or data signals.

* * * * *